US012659475B2

(12) United States Patent
Damghanian et al.

(10) Patent No.: US 12,659,475 B2
(45) Date of Patent: Jun. 16, 2026

(54) EFFICIENT TRANSMISSION OF DECODING INFORMATION

(71) Applicant: Telefonaktiebolaget LM Ericsson (publ), Stockholm (SE)

(72) Inventors: Mitra Damghanian, Upplands-Bro (SE); Du Liu, Solna (SE); Jacob Ström, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 30 days.

(21) Appl. No.: 18/696,311

(22) PCT Filed: Sep. 16, 2022

(86) PCT No.: PCT/SE2022/050815
§ 371 (c)(1),
(2) Date: Mar. 27, 2024

(87) PCT Pub. No.: WO2023/055267
PCT Pub. Date: Apr. 6, 2023

(65) Prior Publication Data
US 2024/0397043 A1 Nov. 28, 2024

Related U.S. Application Data

(60) Provisional application No. 63/249,805, filed on Sep. 29, 2021.

(51) Int. Cl.
*H04N 19/117* (2014.01)
*H04N 19/119* (2014.01)
(Continued)

(52) U.S. Cl.
CPC ......... *H04N 19/117* (2014.11); *H04N 19/119* (2014.11); *H04N 19/124* (2014.11);
(Continued)

(58) Field of Classification Search
None
See application file for complete search history.

(56) References Cited

U.S. PATENT DOCUMENTS 11,436,699 B1 * 9/2022 Wu ........................... G06T 3/40
11,445,168 B1 * 9/2022 Wei ....................... H04N 17/00
(Continued)

OTHER PUBLICATIONS

International Search Report and Written Opinion with Transmittal dated Nov. 14, 2022 in International Application No. PCT/SE2022/050815 (12 pages).
(Continued)

*Primary Examiner* — Mohammad J Rahman
(74) *Attorney, Agent, or Firm* — Rothwell, Figg, Ernst & Manbeck, P.C.

(57) ABSTRACT

There is provided a method for decoding a video frame. The method comprises receiving an encoded video frame sequence data associated with a video frame sequence, wherein the video frame sequence includes the video frame. The method comprises deriving from the received encoded video frame sequence data (i) sample value information of one or more blocks and/or (ii) block information about said one or more blocks. The method further comprises, based on (i) the derived sample value information and/or (ii) the derived block information, selecting from a set of machine learning, ML, models at least one ML model to use for decoding the video frame. The method comprises decoding the video frame using the selected at least one ML model.

16 Claims, 8 Drawing Sheets

(51) Int. Cl.

| | |
|---|---|
| *H04N 19/124* | (2014.01) |
| *H04N 19/132* | (2014.01) |
| *H04N 19/139* | (2014.01) |
| *H04N 19/159* | (2014.01) |
| *H04N 19/172* | (2014.01) |
| *H04N 19/174* | (2014.01) |
| *H04N 19/176* | (2014.01) |
| *H04N 19/186* | (2014.01) |
| *H04N 19/31* | (2014.01) |
| *H04N 19/42* | (2014.01) |
| *H04N 19/70* | (2014.01) |
| *H04N 19/82* | (2014.01) |
| *H04N 19/96* | (2014.01) |

(52) U.S. Cl.
CPC ......... *H04N 19/132* (2014.11); *H04N 19/139* (2014.11); *H04N 19/159* (2014.11); *H04N 19/172* (2014.11); *H04N 19/174* (2014.11); *H04N 19/176* (2014.11); *H04N 19/186* (2014.11); *H04N 19/31* (2014.11); *H04N 19/42* (2014.11); *H04N 19/70* (2014.11); *H04N 19/82* (2014.11); *H04N 19/96* (2014.11)

(56) References Cited

U.S. PATENT DOCUMENTS

| | | | | |
|---|---|---|---|---|
| 11,463,709 | B2 * | 10/2022 | Gao | H04N 19/105 |
| 11,557,025 | B2 * | 1/2023 | Chen | H04N 21/44008 |
| 11,582,442 | B1 * | 2/2023 | Fehervari | H04N 21/2187 |
| 11,729,381 | B2 * | 8/2023 | Hu | H04N 19/82 375/240.29 |
| 11,729,387 | B1 * | 8/2023 | Khsib | H04N 19/124 375/240.03 |
| 11,818,373 | B1 * | 11/2023 | Mama | H04N 7/152 |
| 2018/0192046 | A1 | 7/2018 | Teo et al. | |
| 2019/0246138 | A1 * | 8/2019 | Terterov | H04N 19/14 |
| 2019/0370613 | A1 * | 12/2019 | Arngren | G06N 20/10 |
| 2020/0186796 | A1 | 6/2020 | Mukherjee et al. | |
| 2020/0236349 | A1 | 7/2020 | Zhai et al. | |
| 2020/0413059 | A1 * | 12/2020 | Han | H04N 19/124 |
| 2021/0168408 | A1 * | 6/2021 | Malakhov | H04N 19/52 |
| 2021/0360233 | A1 * | 11/2021 | Ishtiaq | H04L 65/764 |
| 2021/0409702 | A1 * | 12/2021 | Wang | H04N 19/117 |
| 2022/0239845 | A1 * | 7/2022 | Rivas | H04N 19/537 |
| 2022/0318553 | A1 * | 10/2022 | Ben Yahia | G10L 25/57 |
| 2023/0035282 | A1 * | 2/2023 | Huang | G06N 3/08 |
| 2023/0054130 | A1 * | 2/2023 | Wang | H04N 19/12 |
| 2023/0080803 | A1 * | 3/2023 | Holland | H04N 23/6815 348/222.1 |
| 2023/0224476 | A1 * | 7/2023 | Randell | H04N 19/159 |
| 2023/0240656 | A1 * | 8/2023 | Agarwal | G16H 40/63 600/408 |
| 2023/0360182 | A1 * | 11/2023 | Fanello | G06T 11/00 |
| 2023/0360437 | A1 * | 11/2023 | Shin | G06T 7/10 |
| 2023/0410255 | A1 * | 12/2023 | Zhang | G06F 9/5027 |
| 2023/0412808 | A1 * | 12/2023 | Holland | H04N 19/126 |

OTHER PUBLICATIONS

Jia, C. et al., "Content-Aware Convolutional Neural Network for In-Loop Filtering in High Efficiency Video Coding", IEEE Transactions On Image Processing, vol. 28, No. 7, Jul. 2019 (14 pages).
Liu, D. et al., "Deep Learning-Based Video Coding: A Review and A Case Study", arxv.org, XP081268317, Apr. 29, 2019 (35 pages).
Liu, D. et al., "Deep Learning-Based Video Coding: A Review and a Case Study", ACM Computing Surveys, vol. 53, No. 1, Article 11. Publication date: Feb. 2020, XP058666711 (35 pages).

* cited by examiner

H.266(20)_F07

☐ CTU   ☐ Tile   ⌐⌐⌐ Subpicture/slice

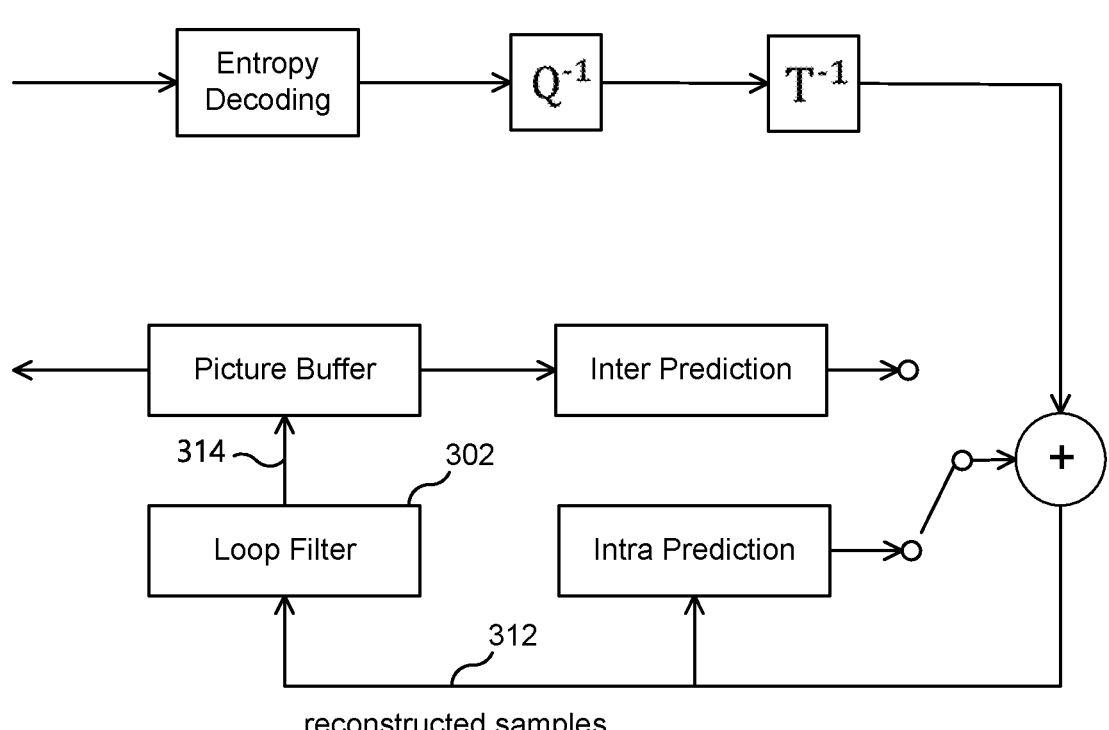
FIG. 3

400

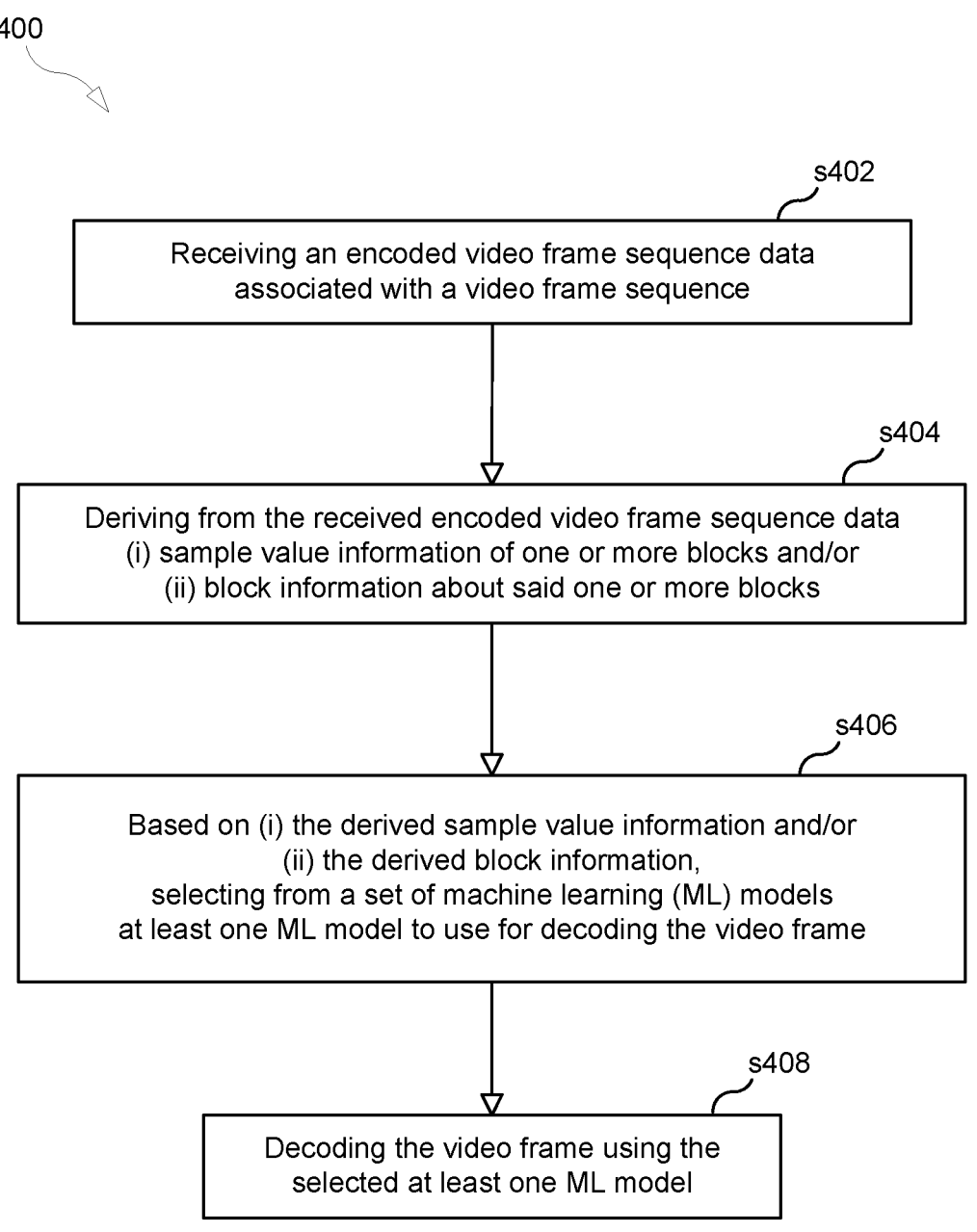

s402

Receiving an encoded video frame sequence data
associated with a video frame sequence s404

Deriving from the received encoded video frame sequence data
(i) sample value information of one or more blocks and/or
(ii) block information about said one or more blocks s406

Based on (i) the derived sample value information and/or
(ii) the derived block information,
selecting from a set of machine learning (ML) models
at least one ML model to use for decoding the video frame s408

Decoding the video frame using the
selected at least one ML model

Obtaining (i) sample value information of one or more blocks and/or (ii) block information about said one or more blocks s504

Encoding (i) the sample value information of said one or more blocks and/or (ii) the block information about said one or more blocks into a video frame sequence data associated with a video frame sequence

302

EFFICIENT TRANSMISSION OF DECODING INFORMATION

CROSS REFERENCE TO RELATED APPLICATIONS

This application is a 35 U.S.C. § 371 National Stage of International Patent Application No. PCT/SE2022/050815, filed 2022 Sep. 16, which claims priority to U.S. Provisional Patent Application No. 63/249,805, filed 2021 Sep. 29. The above identified applications are incorporated by this reference.

TECHNICAL FIELD

This disclosure relates to methods and apparatus for efficient transmission of decoding information.

BACKGROUND

Video is a dominant form of data traffic in today's networks, and it is projected that its share in the data traffic will continue to increase. Thus, there is a need to find a way to reduce the amount of data traffic needed for transmitting a video. One way to reduce the amount of data traffic per video is using data compression. In data compression, a source video is encoded to a bitstream, which then can be stored and transmitted to end users. Using a decoder, the end user can extract and derive the source video from the bitstream, and the obtained source video can be displayed on a display screen.

In order to allow the decoder to properly decode the received bitstream, the encoder should compress the video in a standardized format. Otherwise, the bitstream will not be decoded properly because the encoder does not know what kind of device is used as the decoder, and thus may end up encoding the source video in a format that the decoder does not recognize or does not know how to decode. If the source video is compressed in a standardized format, all devices (decoders or devices including the decoders) which support the chosen standard format would be able to properly decode the video.

Compression can be either lossless (i.e., the decoded video will be identical to the source video given to the encoder) or lossy. In lossy compression, a certain degradation of video is accepted. Whether compression is lossless or lossy has a significant impact on the bitrate. The bitrate may represent a degree of compression ratio. Factors such as noise can make lossless compression quite expensive.

Video standards are usually developed by international organizations as these represent different companies and research institutes with different areas of expertise and interests. The currently most applied video compression standard is H.264/Advanced Video Coding (AVC) which was jointly developed by the International Telecommunication Union Telecommunication Standardized Sector (ITU-T) and the International Organization for Standardization (ISO). The first version of H.264/AVC was finalized in 2003, with several updates in the following years. The successor of H.264/AVC, which was also developed by ITU-T and ISO, is known as H.265/HEVC (High Efficiency Video Coding) and was finalized in 2013.

High Efficiency Video Coding (HEVC) is a block-based video codec and utilizes both temporal and spatial prediction. Spatial prediction is achieved using intra (I) prediction from within the current picture. Temporal prediction is achieved using uni-directional (P) or bi-directional inter (B)

prediction on block level from previously decoded reference pictures. In the encoder, the difference between the original pixel data and the predicted pixel data (referred to as the residual) is transformed into the frequency domain, quantized and then entropy coded before transmitted together with necessary prediction parameters such as prediction mode and motion vectors (also entropy coded). The decoder performs entropy decoding, inverse quantization, and inverse transformation to obtain the residual, and then adds the residual to an intra or inter prediction to reconstruct a picture.

Moving Picture Experts Group (MPEG) and ITU-T have created a successor to HEVC within the Joint Video Exploratory Team (JVET). The name of this video codec is Versatile Video Coding (VVC) and version 1 of VVC specification has been published as Rec. ITU-T H.266|ISO/IEC 23090-3, "Versatile Video Coding", 2020.

SUMMARY

To improve the quality of decoding, a machine learning (ML) model (e.g., a neural network (NN) model) may be used.

However, certain challenges exist. Generally, in order for the decoder to select a proper ML model for decoding a video, the information identifying the proper ML model must be signaled to the decoder. For example, in EE1-1.4: Test on Neural Network-based In-Loop Filter with Large Activation Layer, H. Wang, J. Chen, A. M. Kotra, K. Reuze, M. Karczewicz, JVET-V0115, April 2021 (herein after, "NPL 1"), which is incorporated by reference, a single NN model is selected from four NN models for each of the luma channel and the chroma channels per frame. The NPL 1 discloses that there is a signaling cost for turning the NN loop filtering on or off per CTU. In EE1-related: Neural Network-based in-loop filter with constrained computational complexity, H. Wang, J. Chen, K. Reuze, A. M. Kotra, M. Karczewicz, JVET-W0131, July 2021 (herein after, "NPL 2"), which is incorporated by reference, there is provided a method of reducing the cost for signaling a NN model selection. The method comprises signaling one NN model selected from four NN models for both luma and chroma channels. But even in the method, the signaling cost for turning the NN loop filtering on or off per CTU remains the same with respect to the cost discussed in the NPL 1. This associated signaling cost affects performance of the NN-based filtering solution and thus is desirable to be minimized.

Since the selection of models needs to be signaled, the signaling penalty can be measured by allowing the encoder to signal the model selection but not allowing the encoder to ever use it. For measuring the signaling penalty in JVET-W0131 ("NPL 2"), the deblocking filter is turned off and NN loop filters are used. The following Table 1 shows the signaling penalty of JVET-W0131 compared to a version of the NNVC software where the deblocking filter has been off. This difference is thus only due to the signaling overhead associated with the NN-filter (even though it is never used). As is shown, there is 0.78% loss in BDrate for Random Access (RA) and 0.07% loss for All-Intra (AI) configurations.

3

TABLE 1

| Signaling penalty of JVET-W0131 over NNVC software with deblocking filter off. | | | | | |
|---|---|---|---|---|---|
| Random Access | | | All Intra | | |
| Y-PSNR | U-PSNR | V-PSNR | Y-PSNR | U-PSNR | V-PSNR |
| Class D | 0.78% | 0.71% | 0.73% | 0.07% | 0.06% | 0.06% |

There is redundancy in the current signaling of the NN models in the methods proposed in JVET-V0115 and JVET-W0131. Reducing or removing this redundancy can improve the performance without increasing the complexity which will then improve the complexity performance trade-off.

In one aspect, there is provided a method for decoding a video frame. The method comprises receiving an encoded video frame sequence data associated with a video frame sequence, wherein the video frame sequence includes the video frame. The method further comprises deriving from the received encoded video frame sequence data (i) sample value information of one or more blocks and/or (ii) block information about said one or more blocks. The method further comprises based on (i) the derived sample value information and/or (ii) the derived block information, selecting from a set of machine learning (ML) models at least one ML model to use for decoding the video frame. The method further comprises decoding the video frame using the selected at least one ML model.

In another aspect, there is provided a method for encoding a video frame. The method comprises obtaining (i) sample value information of one or more blocks and/or (ii) block information about said one or more blocks. The method further comprises encoding (i) the sample value information of said one or more blocks and/or (ii) the block information about said one or more blocks into a video frame sequence data associated with a video frame sequence. The video frame sequence includes the video frame, and at least one ML model for decoding the video frame is selected from a plurality of ML models based on the sample value information and/or the block information using a ML selection algorithm.

In another aspect, there is provided a computer program comprising instructions which when executed by processing circuitry cause the processing circuitry to perform the method of any one of the above embodiments.

In another aspect, there is provided an apparatus for improving user experience associated with an application supported by a system. The apparatus is configured to receive an encoded video frame sequence data associated with a video frame sequence, wherein the video frame sequence includes the video frame. The apparatus is further configured to derive from the received encoded video frame sequence data (i) sample value information of one or more blocks and/or (ii) block information about said one or more blocks. The apparatus is further configured to based on (i) the derived sample value information and/or (ii) the derived block information, select from a set of machine learning (ML) models at least one ML model to use for decoding the video frame. The apparatus is further configured to decode the video frame using the selected at least one ML model.

In another aspect, there is provided an apparatus for encoding a video frame. The apparatus is configured to obtain (i) sample value information of one or more blocks and/or (ii) block information about said one or more blocks. The apparatus is further configured to encode (i) the sample value information of said one or more blocks and/or (ii) the block information about said one or more blocks into a video frame sequence data associated with a video frame sequence. The video frame sequence includes the video frame, and at least one ML model for decoding the video frame is selected from a plurality of ML models based on the sample value information and/or the block information using a ML selection algorithm.

In another aspect, there is provided an apparatus an apparatus comprising a memory; and processing circuitry coupled to the memory. The apparatus is configured to perform the method of any one of the above embodiments.

Embodiments of this disclosure improve the performance (e.g., coding efficiency) by reducing or completely avoiding unnecessary signaling of the NN model choice in the bit-stream. In the proposed solution, the redundancy in the bitstream will be reduced by deriving the NN model choice in the decoder rather than explicitly signaling the NN model choice in the bitstream and decoding the explicit choice from the bitstream. The NN model choice is derived on the decoder side partially or completely from other information already existing in the bitstream Reducing or not requiring the explicit signaling of the ML model selection will improve transmission efficiency of decoding information, thereby improving the performance of ML-based video codec.

BRIEF DESCRIPTION OF THE DRAWINGS

The accompanying drawings, which are incorporated herein and form part of the specification, illustrate various embodiments.

FIG. 3 shows an example decoder.

FIG. 4 illustrates a process according to some embodiments.

DETAILED DESCRIPTION

Accordingly, in some embodiments of this disclosure, there is provided a method for reducing or not requiring an explicit signaling of a ML model selection (i.e., the ML model that is to be used for decoding) to a decoder. Instead of relying on the explicit signaling, the decoder may select the ML model that is appropriate for decoding (e.g., filtering) at least partly based on existing information (e.g., slice information, quantization parameter (QP) information, and encoded block information) in the bitstream that the decoder receives from the encoder. By using the existing information in the bitstream, the explicit signaling of the ML model selection may be reduced or removed at one or more of the sequence level, frame level, or CTU level.

Figure 1:
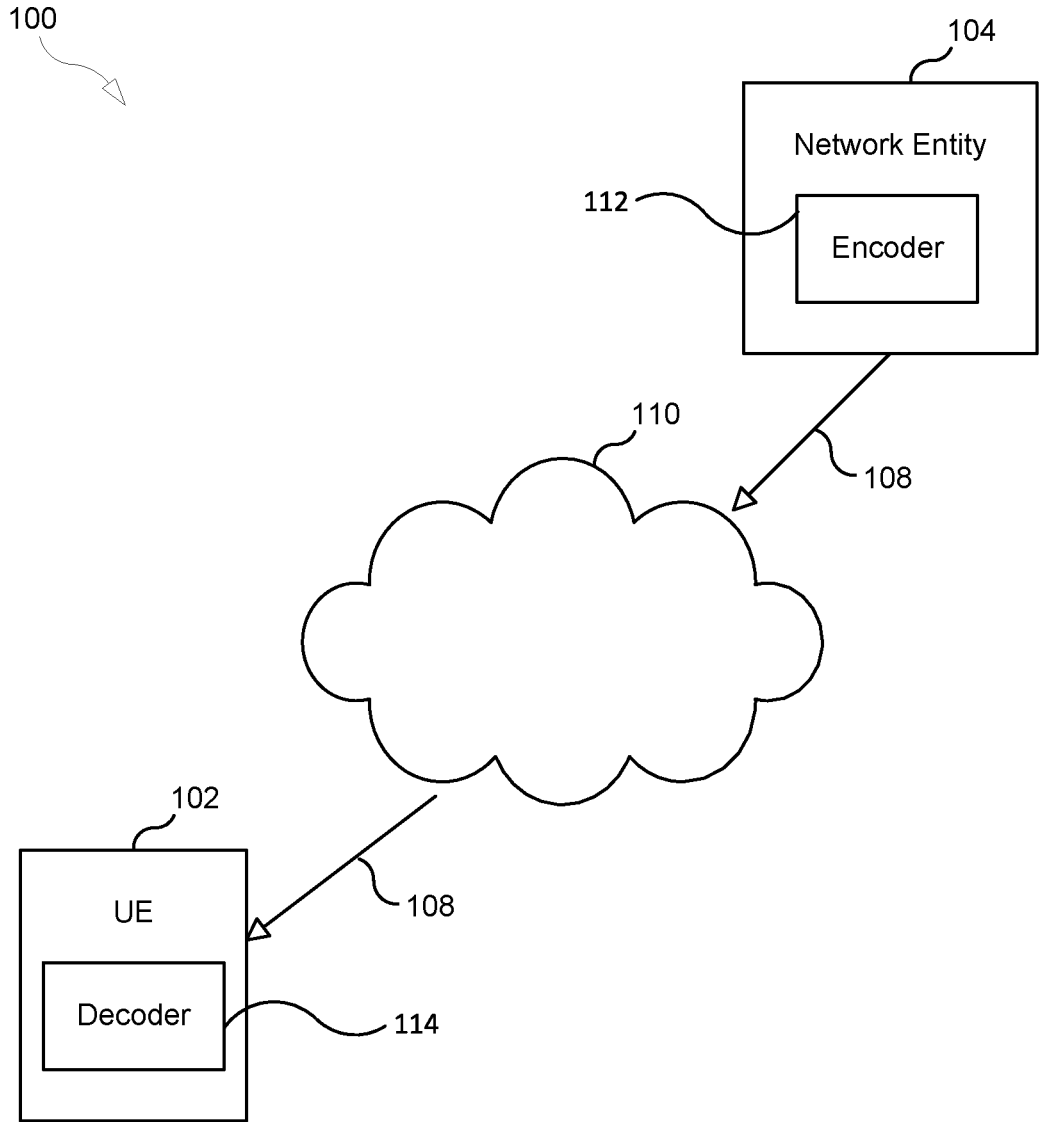
FIG. 1 shows a system according to some embodiments.

FIG. 1 shows a system 100 according to some embodiments. System 100 may comprise a user equipment (UE) 102, a network entity 104, and a network 110. UE 102 may be any of a desktop, a laptop, a tablet, a mobile phone, or any other computing device. Network entity 104 may be any computing device (e.g., a server) that is capable of sending a video stream to UE 102. For example, network entity 104 is a content providing server that is configured to store various video contents and send the video contends towards UEs upon receiving requests from the UEs. In another example, network entity 104 is a content delivery server that is capable of obtaining various video contents from a content storage entity and delivering the video contents to UEs.

As shown in FIG. 1, network entity 104 may include an encoder 112. Encoder 112 may be configured to encode a source video, thereby generating a video stream 108 (i.e., an encoded video). Video stream 108 may be a compressed version of the source video. After generating video stream 108, network entity 104 may be configured to send toward UE 102 video stream 108. Even though FIG. 1 shows that encoder 112 is included in network entity 104, in some embodiments, encoder 112 is provided in a network entity that is separate and different from network entity 104.

Figure 2:
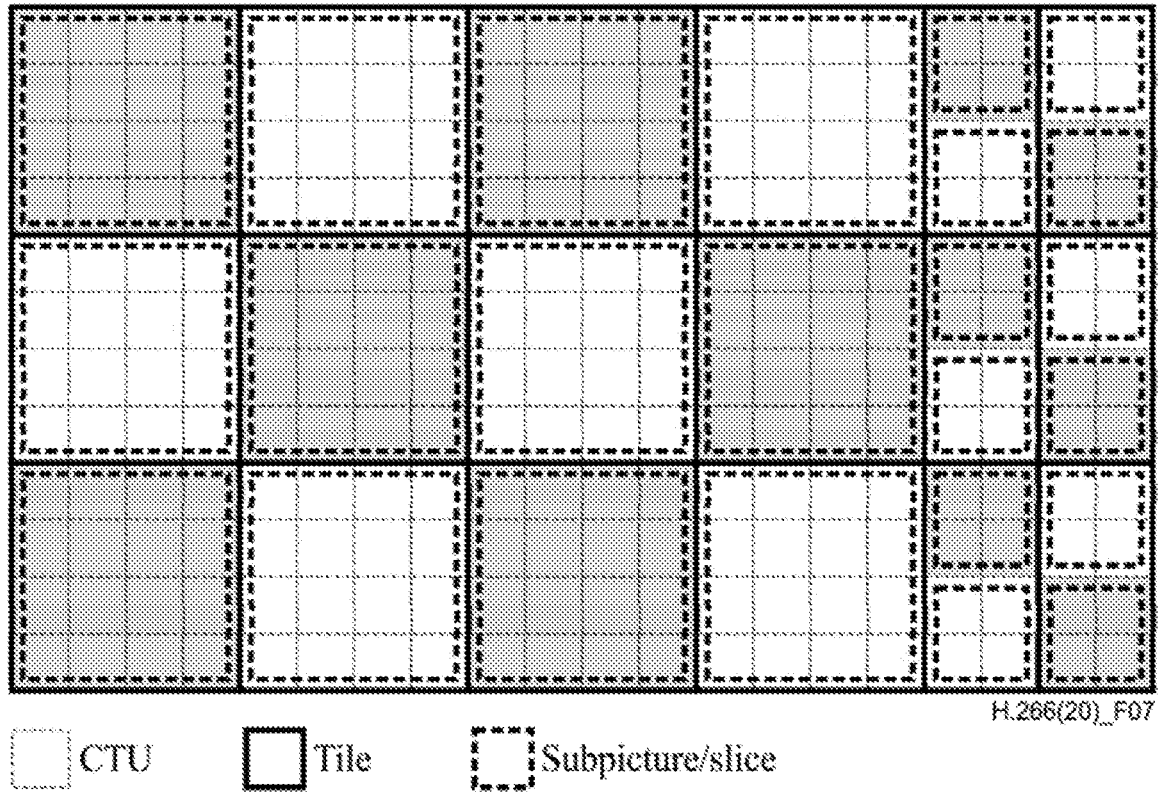
FIG. 2 illustrates how a frame can be partitioned.

In this disclosure, a video and a video frame sequence mean the same thing and are used interchangeably. A video or a video frame sequence is a sequence of plurality of frames. An encoded video (a.k.a., encoded video data) or an encoded video frame sequence (a.k.a., encoded video frame sequence data) is a video stream (a.k.a, a bitstream). Also, in this disclosure, a frame, a video frame, and a picture mean the same thing and are used interchangeably. FIG. 2 shows an exemplary layout of each frame. As shown in FIG. 2, each frame may be partitioned into a plurality of coding tree units (CTUs), tiles, subpictures, and/or slices.

Referring back to FIG. 1, UE 102 may be configured to receive video stream 108 delivered via network 110. In some embodiments, UE 102 may include a decoder 114. Upon receiving video stream 108, decoder 114 may be configured to decode video stream 108, thereby generating a decoded video. Even though FIG. 1 shows that decoder 114 is included in UE 102, in some embodiments, decoder 114 is provided in a local computing entity that is separate and different from UE 102. In such embodiment, after decoding, decoder 114 may be configured to provide to UE 102 the decoded video.

FIG. 3 shows an exemplary structure of decoder 114.

As shown in FIG. 3, decoder 114 may include various elements that are capable of performing various processes/ functions such as inter-prediction, intra-prediction, inverse quantization, filtering (e.g., deblocking), etc. In this disclosure, any of the processes/functions performed by the elements included in decoder 114 is considered as a part of decoding process.

In some embodiments, one or more elements included in decoder 114 may use a Machine Learning (ML) decoding model (e.g., a Neural Network (NN) model) to perform its functions. For example, loop filter unit 302 may use a ML decoding model to filter reconstructed samples 312, thereby producing filtered samples 314.

Figure 7:
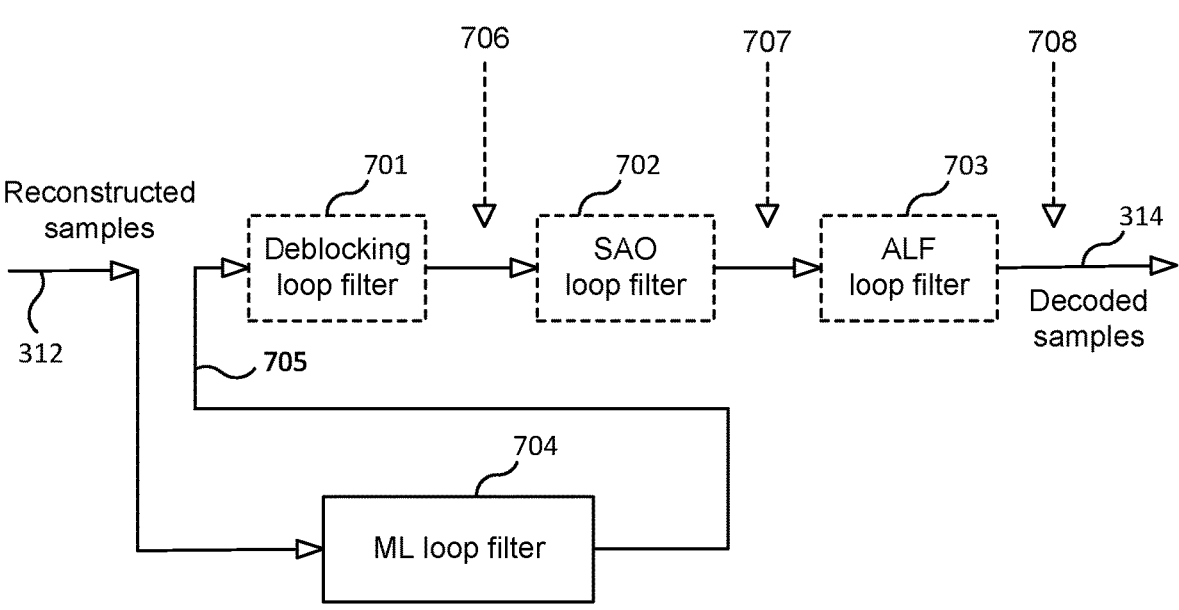
FIG. 7 shows an example of a loop filter unit included in a decoder.

A more detailed view of the loop filter unit 302 is shown in FIG. 7. In a traditional encoder such as VVC, the reconstructed samples 312 are forwarded to the input 705 of a deblocking loop filter 701, the output of which is fed into the input 706 of an SAO loop filter 702. The output of the SAO loop filter is then fed to the input 707 of an ALF loop filter 703. The output of the loop filter 708 becomes the decoded samples 314. In some embodiments of this disclosure, the ML loop filter 704 may operate with the reconstructed samples 704 as the input and feed these to the input 705 of the deblocking filter 701. However, in a different embodiment the deblocking loop filter 701 may be removed, and the reconstructed samples 312 may be fed into the ML loop filter 704, and the output of the ML loop filter may be fed into the input 706 of the SAO loop filter. In other embodiment, the reconstructed samples 312 are fed into the input 705 of the deblocking loop filter 701, and the output of this filter is fed into the ML loop filter 704, and its output in turn is fed into the input 706 of the SAO loop filter. In other embodiments, the ML loop filter may be in parallel with one or more of the loop filters 701, 702, and 703.

Different frames and/or different blocks included in the same frame may be associated with different ML decoding models. For example, a first ML decoding model may be optimal for filtering a first frame while a second ML decoding model may be optimal for filtering a second frame. Thus, decoder 114 may need to select a particular ML decoding model from among a plurality of available ML decoding models for the optimal filtering process.

Because different frames and/or different blocks are included in the received input video frame sequence that is encoded (a.k.a., bitstream) and the use of different ML decoding models may be desirable for different frames and/or different blocks, it is desirable to inform decoder 114 as to which ML decoding model among the plurality of ML decoding models to use for decoding a frame or a block. But explicit signaling of the ML decoding model may occupy too much bandwidth. Accordingly, in some embodiments, decoder 114 may use the information that is already available in the encoded video frame sequence data to select a ML decoding model from among a plurality of ML decoding models.

The information that is available in the encoded video frame sequence data that may be used for selecting a ML decoding model (a.k.a., block information) may comprise any one or a combination of decoding parameters included in the following set of decoding parameters: a slice type information identifying a type of a slice included in the video frame, a prediction mode information indicating a prediction mode associated with the video frame, an inter or intra coded block information indicating how one or more blocks are inter-coded or intra-coded, a frame quantization parameter (QP) information indicating a QP associated with the video frame, a delta QP information indicating the existence and the value of a QP associated with one or more blocks, a motion vector information indicating one or more motion vectors associated with one or more blocks, wherein the motion vector information includes the existence and the value of one or more motion vectors associated with said one or more blocks, a block partitioning information indicating how blocks are partitioned in the video frame, a picture tile partitioning information indicating how tiles are partitioned in the video frame, a picture slice partitioning information indicating how slices are partitioned in the video frame, a subpicture partitioning information indicating how subpictures are partitioned in the video frame, block information about one or more blocks included in another video frame included in the video frame sequence, a temporal layer identifier information indicating information about which temporal layer one or more blocks belongs to, statistics of a current coding tree unit (CTU) (e.g., a variance of the current CTU), wherein the statistics of the CTU are statistics of values of some or all samples included in the current CTU, statistics of one or more CTUs included in another video frame included in the video frame sequence, or statistics of one or more neighboring CTUs neighboring the current CTU (e.g., a difference of variances between one or more neighboring CTUs). The statistics of said one or more neighboring CTUs are statistics of values of samples included in said one or more neighboring CTUs. For example, the statistics may be a sum of absolute differences between the current CTU and the neighboring CTUs neighboring the current CTU.

As discussed above, decoder 114 may select a ML decoding model based on the information that is available in the encoded video frame sequence data. In one example, decoder 114 may select a ML decoding model "A" from a group of ML decoding models for filtering CTUs included in a current frame if the current frame is intra-coded. On the other hand, decoder 114 may select a ML decoding model "B" from the group of ML decoding models for filtering CTUs included in a particular frame if the particular frame is inter-coded.

In another example, decoder 114 may select a ML decoding model "C" from the group for filtering CTUs included in a frame if (i) the frame is inter-coded and (ii) a QP of the frame is larger than a threshold value while decoder 114 may select a ML decoding model "D" from the group for filtering CTUs included in a frame if (i) the frame is inter-coded and (ii) a QP of the frame is less than the threshold value.

In some embodiments, instead of or in addition to using the existing information included in encoded video frame sequence 108, decoder 114 may select a ML decoding model from a group of decoding ML models based on values of partially processed samples in decoder 114. As an example, if a ML decoding model is used for filtering reconstructed samples in decoder 114, then reconstructed samples may be used for selecting a ML decoding model. In such example, if an average of values of samples included in a reconstructed frame (a frame containing the reconstructed samples) is below a threshold value (i.e., if the frame is a dark image), a ML decoding model that is optimal for dark images may be used. On the other hand, if the average of values of samples included in the reconstructed frame is greater than or equal to the threshold value, a ML decoding model that is optimal for bright images may be used. Taking decoder 114 shown in FIG. 3 as an example, in some embodiments, a ML decoding model may be used within loop filter module 302. In other words, the ML decoding model may be configured to perform a filtering operation on reconstructed samples 312. In such example, decoder 114 may select a ML decoding model based on reconstructed samples 312.

In some embodiments, each ML decoding model may be trained and/or selected using training data associated with a particular subset of decoding parameters included in the set of decoding parameters discussed above. In these embodiments, each ML decoding model may be specialized or optimized for the blocks which have the particular subset of decoding parameters after encoding.

In some embodiments, the block information may comprise a plurality of subsets of block information. In such embodiments, a ML decoding model may be trained for each of the plurality of subsets of block information. Then at decoder 114, a ML decoding model for decoding a black or a frame may be selected from among a plurality of ML decoding models based on the block information which indicates which subset of block information is signaled for the block or the frame.

In some embodiments, instead of selecting a ML decoding model per frame, a ML decoding model may be selected per block. The block may be any one of a CU, a CTB, a CTU, a tile, a slice, a subpicture, or other types of partitions or block partitions of a picture (a.k.a., a video frame). Explicit signaling of a choice of a ML decoding model in case a ML decoding model is to be selected per block would cost more as compared to the cost for explicit signaling of a choice of a ML decoding model in case a ML decoding model is to be selected per frame. Thus, like the embodiments above, in these embodiments, rather than relying on explicit signaling of the choice of a ML decoding model, decoder 114 may select a ML decoding model from a plurality of ML decoding models based on existing information in the bitstream.

In some embodiments, the number of ML decoding models that are available for decoding may be as many as possible combination of the elements of the block information.

In some embodiments, instead of using a simple function or a look-up table, a ML classifier (e.g., a NN model) may be used to select from among a plurality of ML decoding models a ML decoding model to be used for decoding (e.g., filtering) each frame or one or more blocks of a video frame. This ML classifier may be configured to map a video frame or a block of the video frame to a ML decoding model.

For example, after a video frame is reconstructed during the decoding process, the reconstructed video frame may be provided to the ML classifier. Based on the values of samples included in the reconstructed video frame, the ML classifier may be configured to select one of available ML decoding models. Decoder 114 may use the selected ML decoding model to filter the reconstructed video frame.

In some embodiments, instead of selecting and outputting a particular ML decoding model, the ML classifier may be configured to evaluate all or a subset of available ML decoding models and determine which one of the ML decoding models is better in terms of decoding a particular block or frame. The subset of available ML decoding models may be chosen using the block information described above. The result of the evaluations may be provided to decoder 114. Based on the result of the evaluations, decoder 114 may determine which ML decoding model to use for filtering the reconstructed video frame. For example, among the available ML decoding models #1, #2, and #3, if the ML classifier determines that model #3 performs better than models #1 and #2, decoder 114 may use model #3 for decoding the particular block or frame.

In some embodiments, a ML classifier may be provided in encoder 112 too. In such embodiments, the ML classifier provided in decoder 114 and the ML classifier provided in encoder 112 may be the same or different.

For example, the ML classifier included in one of encoder 112 and decoder 114 may be configured to apply pre-processing steps on the inputs while the ML classifier included in another of encoder 112 and decoder 114 is not configured to apply pre-processing steps on the inputs but rather receive pre-processed inputs. In such case, the ML classifier provided in encoder 112 and the ML classifier provided in decoder 114 are different.

In another example, the ML classifier in encoder 112 and the ML classifier in decoder 114 may be the same. In other words, the ML classifiers in encoder 112 and decoder 114 may have the same architecture and the same weights for the inputs. In such case, the ML classifiers would select the same ML decoding model given the same inputs (e.g., the same block information).

Instead of or in addition to values of samples included in a particular block or frame, block information of the particular block or frame may be used as the input of the ML classifier included in encoder 112 or decoder 114. Examples of the block information are provided above.

In some embodiments, encoder 112 may signal decoder 114 as to whether encoder 112 will explicitly signal decoder 114 a ML decoding model to use for decoding. More specifically, the encoded video frame sequence (a.k.a., the bitstream) may include one or more syntax elements that specify if the encoded video frame sequence includes an explicit identification of a ML decoding model to use for decoding. For example, the bitstream may include a syntax element (e.g., a flag) S1. If the value of S1 is equal to V1, the ML decoding model to be used for decoding is explicitly indicated in the bitstream. On the other hand, if the value of S1 is equal to V2, the ML decoding model to be used for decoding is not explicitly indicated in the bitstream. In such case, decoder 114 may need to select an appropriate ML decoding model from a plurality of ML decoding models based on other information included in the bitstream.

In some embodiments, the syntax element may indicate that there will be an explicit signaling of a ML decoding model to be used for decoding a frame N and all subsequent frames following the frame N in the signaling order (i.e., the order of receiving the frames) or in the decoding order (i.e., the order of decoding the frames) until decoder 114 receives a bitstream including a syntax element having a different value.

In some embodiments, encoder 112 may selectively signal or not signal decoder 114 as to which ML decoding model to use for decoding. More specifically, there may be scenarios where encoder 112's explicit signaling of a ML decoding model to use for decoding may not be necessary because any one of available ML decoding models would produce the same decoding result (i.e., the decoded frames or blocks will have the substantially same quality).

For example, in case a block or a frame that is to be decoded is completely black, any one of available ML decoding models would produce the same result (i.e., the decoded frames or blocks will have the same quality). In such case, it does not matter which ML decoding model decoder 114 uses for decoding, and thus any signaling of a ML decoding model to be used for decoding will be unnecessary and waste transmission bits.

Thus, according to some embodiments, in such scenarios, encoder 112 does not provide to decoder 114 any explicit signaling of a ML decoding model to use for decoding, and decoder 114 selects any one of available ML decoding models for decoding. Encoder 112 may check whether all available ML decoding models produce substantially the same decoding result for decoding a group of one or more picture segments (e.g., CTUs, blocks, etc.) in a frame. If it is determined that all available ML decoding models produce substantially the same decoding result, then encoder 112 may not signal to decoder 114 any particular ML decoding model that decoder 114 may use for decoding for the group of one or more picture segments.

Like encoder 112, decoder 114 may check whether all available ML decoding models produce substantially the same decoding result for a group of one or more picture segments. By determining that all ML decoding models produce substantially the same decoding result, decoder 114 would know that encoder 112 will not explicitly signal a ML decoding model to use for decoding. On the other hand, by determining that not all ML decoding models produce substantially the same decoding result, decoder 114 may expect a signaling from encoder 112 as to which ML decoding model to use for decoding.

In some embodiments, decoder 114 may use the bitstream (in the form of codewords or in the form of decoded samples) as well as signaling sent by encoder 112 to select a ML decoding model for decoding a video frame or a block.

More specifically, decoder 114 may be configured to evaluate performance of available ML decoding models using an evaluation algorithm (e.g., a ML classifier). For example, if the available ML decoding models are model 1, model 2, model 3, and model 4, the evaluation algorithm may be configured to evaluate models 1-4 and rank them according to the evaluation. The ranking may be related to model's expected performance of decoding a video frame (e.g., from the model that is most probable to improve the decoding quality to the model that is least probable to improve the decoding quality).

The table below shows how the ML classifier may rank the models.

| Rank | Model | Bit Signaled |
|---|---|---|
| 1 | Model 3 | 1 |
| 2 | Model 1 | 01 |
| 3 | Model 0 | 001 |
| 4 | Model 2 | 000 |

Here, the evaluation algorithm of decoder 114 determines that model 3 is the model with the highest probability of being best at decoding a video frame. This means that model 3 is the model that is likely to be sent by encoder 112 (because encoder 112 is likely to select a ML decoding model that provides the best performance). Thus, in these embodiments, a bit value having the shortest length (i.e., one bit) is assigned to model 3. Similarly, a bit value having the second shortest length (i.e., two bits) is assigned to model 1 that is the second best model and a bit value having the third shortest length (i.e., third bits) is assigned to model 0 that is the third best model. Here, if the evaluation algorithm correctly guesses the best ML decoding model for decoding, a bit value having a bit length of 1 bit (instead of 2 bits or 3 bits) is needed to indicate a ML decoding model to be used. Thus, the cost for explicitly signaling a selection of a ML decoding model may be reduced.

In other embodiments, a different evaluation algorithm (e.g., a different ML classifier) may be used to decide whether a certain CTU should be turned on or off. Since there are three channels (YUV) in a CTU, there are 8 different combinations of on-off-behavior for each CTU. One way of signaling a different combination of YUV is using a single bit per component according to the following table:

| On/Off status | Traditional bit signaling |
|---|---|
| Y-on, U-on, V-on | 111 |
| Y-on, U-on, V-off | 110 |
| Y-on, U-off, V-on, | 101 |
| Y-on, U-off, V-off, | 100 |
| Y-off, U-on, V-on | 011 |
| Y-off, U-on, V-off | 010 |
| Y-off, U-off, V-on, | 001 |
| Y-off, U-off, V-off, | 000 |

However, since all these combinations are not equally probable, it is may be desirable to use shorter codes for more common combinations, as shown below.

| On/Off status | Bit signaling |
|---|---|
| Y-on, U-on, V-on | 00 |
| Y-on, U-on, V-off | 010 |
| Y-on, U-off, V-on, | 011 |
| Y-on, U-off, V-off, | 1000 |
| Y-off, U-on, V-on | 1001 |
| Y-off, U-on, V-off | 1010 |

-continued

| On/Off status | Bit signaling |
|---|---|
| Y-off, U-off, V-on, | 1011 |
| Y-off, U-off, V-off, | 1100 |

In some embodiments, an evaluation algorithm may take pre-filtering samples as the input of the evaluation algorithm and output a ranking. For example, the evaluation algorithm may decide that it is most likely that the U-component will not be filtered. In such case, the following ranking may be performed:

| Rank | On/Off status | Bit signaling |
|---|---|---|
| 1 | Y-on, U-off, V-on, | 00 |
| 2 | Y-on, U-off, V-off, | 010 |
| 3 | Y-off, U-off, V-on, | 011 |
| 4 | Y-off, U-off, V-off, | 1000 |
| 5 | Y-on, U-on, V-on | 1001 |
| 6 | Y-on, U-on, V-off | 1010 |
| 7 | Y-off, U-on, V-on | 1011 |
| 8 | Y-off, U-on, V-off | 1100 |

In this case, on/off combinations that have the U-component turned off are signaled using fewer bits, and combinations that have the U-component turned on are signaled using more bits.

As explained above, in some embodiments of this disclosure, decoder 114 may be configured to select from a plurality of ML decoding models a ML decoding model using a ML decoding model selection algorithm. The algorithm may be stored in decoder 114 in the form of a look-up table, one or more logical operations, and a ML classifier. The same decoding model selection algorithm (i.e., the algorithm that is stored in decoder 114) may be stored in or provided to encoder 112 too. For example, a content provider or a manufacturer may provide the algorithm to both of encoder 112 and decoder 114. Providing the same algorithm to encoder 112 and decoder 114 would ensure that encoder 112 knows which ML decoding model decoder 114 will select for decoding a video frame.

FIG. 4 shows a process 400 for decoding a video frame, according to some embodiments. Process 400 may begin with step s402. Step s402 comprises receiving an encoded video frame sequence data associated with a video frame sequence, wherein the video frame sequence includes the video frame. Step s404 comprises deriving from the received encoded video frame sequence data (i) sample value information of one or more blocks and/or (ii) block information about said one or more blocks. Step s406 comprises based on (i) the derived sample value information and/or (ii) the derived block information, selecting from a set of machine learning (ML) models at least one ML model to use for decoding the video frame. Step s408 comprises decoding the video frame using the selected at least one ML model.

In some embodiments, the block information about said one or more blocks comprises any one or more of: a slice type information identifying a type of a slice included in the video frame, a prediction mode information indicating a prediction mode associated with the video frame, an inter or intra coded block information indicating how one or more blocks are inter-coded or intra-coded, a frame quantization parameter (QP) information indicating a QP associated with the video frame, a delta QP information indicating the existence and the value of a QP associated with one or more blocks, a motion vector information indicating one or more motion vectors associated with one or more blocks, wherein the motion vector information includes the existence and the value of one or more motion vectors associated with said one or more blocks, a block partitioning information indicating how blocks are partitioned in the video frame, a picture tile partitioning information indicating how tiles are partitioned in the video frame, a picture slice partitioning information indicating how slices are partitioned in the video frame, a subpicture partitioning information indicating how subpictures are partitioned in the video frame, block information about one or more blocks included in another video frame included in the video frame sequence, a temporal layer identifier information indicating information about which temporal layer one or more blocks belongs to, statistics of a current coding tree unit (CTU) (e.g., a variance of the current CTU), wherein the statistics of the CTU are statistics of values of samples included in the current CTU, or statistics of one or more neighboring CTUs neighboring the current CTU (e.g., a difference of variances between one or more neighboring CTUs), wherein the statistics of said one or more neighboring CTUs are statistics of values of samples included in said one or more neighboring CTUs.

In some embodiments, the sample value information comprises any one or more of: a luma value of one or more samples included in the video frame, a chroma value of one or more samples included in the video frame, one or more sample values of samples included in a current CTU and/or a neighboring CTU neighboring the current CTU, one or more sample values of samples included in one or more CTUs from another video frame included in the video frame sequence, a variance of sample values of samples in the current CTU, or a difference between a variance of sample values of samples in a neighboring CTU and a variance of sample values of samples in another neighboring CTU.

In some embodiments, the sample value information of said one or more blocks includes sample values of samples included in the video frame, the method further comprises obtaining reconstructed samples based on the sample values of the samples included in the video frame, and the selection of the ML model to use for decoding the video frame is made based on the reconstructed samples.

In some embodiments, the sample value information of said one or more blocks includes sample values of samples included in the video frame, the method further comprises obtaining reconstructed samples based on the sample values of the samples included in the video frame, and the decoding of the video frame comprises filtering the reconstructed samples using the selected ML model.

In some embodiments, each ML model included in the set of ML models is a loop filtering model.

In some embodiments, the block information comprises a set of block information parameters, the set of block information parameters comprises a subset of block information parameters, and said at least one ML model is selected using the subset of block information parameters.

In some embodiments, (i) the sample value information of one or more blocks includes first sample value information of a first block included in the video frame and second sample value information of a second block included in the video frame and/or (ii) the block information of one or more blocks includes first block information of the first block and second block information of the second block. Selecting said at least one ML model to use for decoding the video frame comprises: based on (i) the first sample value information and/or ii) the first block information, selecting from the set of ML models a first ML model to use for decoding the first block, and based on (i) the second sample value information and/or ii) the second block information, selecting from the set of ML models a second ML model to use for decoding the second block. Decoding the video frame using the selected at least one ML model comprises: decoding the first block using the first ML model, and decoding the second block using the second ML model.

In some embodiments, each of said one or more blocks is any one or more of a CTU, a tile, a slice, or a subpicture.

In some embodiments, the method further comprises obtaining a ML model classifier. Selecting said at least one ML model to use for decoding the video frame comprises: providing to the ML model classifier (i) the derived sample value information and/or (ii) the derived block information, and the ML model classifier selecting from the set of ML models said at least one ML model based on (i) the derived sample value information and/or (ii) the derived block information.

In some embodiments, the encoded video frame sequence data comprises one or more ML model selection syntax elements having a first value and a value of said one or more ML model selection syntax elements indicates whether the encoded video frame sequence data comprises information indicating which ML model to use for decoding.

In some embodiments, said one or more ML model selection syntax elements of a first value indicates that the encoded video frame sequence data does not contain the information indicating which ML model to use for decoding, the method further comprises retrieving from the encoded video frame sequence data the first value of said one or more ML model selection syntax elements, and as a result of retrieving the first value of said one or more ML model selection syntax elements, said at least ML model to use for decoding the video frame is selected based on i) the derived sample value information and/or ii) the derived block information.

In some embodiments, the set of ML models includes a first ML model and a second ML model. The method further comprises: decoding the video frame using the first ML model and decoding the video frame using the second ML model, obtaining a first result of decoding the video frame using the first ML model, obtaining a second result of decoding the video frame using the second ML model, and evaluating the first and second results. Selecting the at least one ML model to use for decoding the video frame comprises selecting any one ML model from the set of ML models.

In some embodiments, the set of ML models includes a first ML model and a second ML model, the method further comprises based on (i) the derived sample value information and/or (ii) the derived block information, determining that any of the first ML model and the second ML model will be okay to choose, and selecting the at least one ML model to use for decoding the video frame comprises selecting any one ML model from the first ML model and the second ML model.

In some embodiments, the set of ML models includes a first ML model and a second ML model. The method further comprises: evaluating the first ML model and the second ML model, ranking the first ML model and the second ML model based on the evaluation, and based on the ranking, extracting from the encoded video frame sequence data an identifier identifying said at least one ML model to use for decoding the video frame.

In some embodiments, the first ML model is associated with a first bit value having a first bit length, the second ML model is associated with a second bit value having a second bit length, the first bit length is shorter than the second bit length, the ranking of the first ML model is higher than the ranking of the second ML model, and the identifier has the first bit value.

Figure 5:
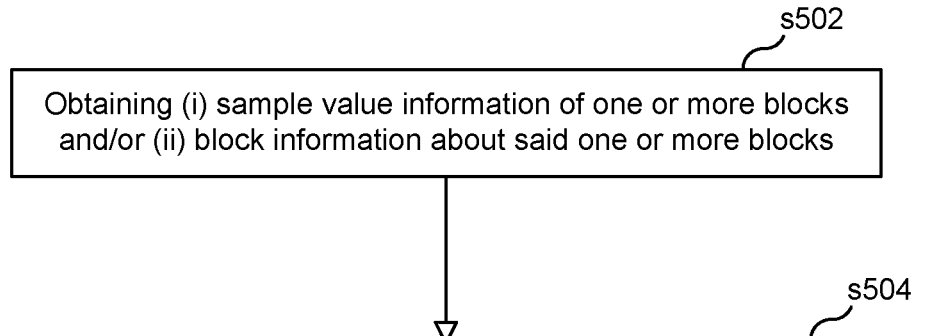
FIG. 5 illustrates a process according to some embodiments.

FIG. 5 shows a process 500 for encoding a video frame. Process 500 may begin with step s502. Step s502 comprises obtaining (i) sample value information of one or more blocks and/or (ii) block information about said one or more blocks. Step s504 comprises encoding (i) the sample value information of said one or more blocks and/or (ii) the block information about said one or more blocks into a video frame sequence data associated with a video frame sequence. The video frame sequence includes the video frame, and at least one ML model for decoding the video frame is selected from a plurality of ML models based on the sample value information and/or the block information using a ML selection algorithm.

In some embodiments, the selection of said at least one ML model from the plurality of ML models is made based on the sample value information and/or the block information.

In some embodiments, the method further comprises encoding into the video frame sequence data one or more ML model selection syntax elements, wherein a value of said one or more ML model selection syntax elements indicates whether the encoded video frame sequence data comprises information indicating which ML model to use for decoding the video frame.

In some embodiments, the method further comprises evaluating two or more of the plurality of ML models, based on the evaluation, obtaining a performance score for each of said two or more ML models, determining whether a difference between the performance scores of said two or more ML models is greater than or equal to a threshold value, and based on the determination, determining to encode into the video frame sequence data said one or more ML model selection syntax elements.

In some embodiments, the method further comprises ranking two or more of the plurality of ML models, based on the rankings of said two or more ML models, assigning to said two or more ML models bit values having different bit lengths; and encoding into the video frame sequence data one of the bit values.

In some embodiments, the method further comprises evaluating said two or more ML models, and said two or more ML models are ranked according to the evaluation.

In some embodiments, said two or more ML models comprises a first ML model and a second ML model, assigning to said two or more ML models the bit values comprises assigning to the first ML model a first bit value having a first bit length and assigning to the second ML model a second bit value having a second bit length, the ranking of the first ML model is higher than the ranking of the second ML model, the first bit length is shorter than the second bit length, and the method comprises encoding into the video frame sequence data the first bit value.

Figure 6:
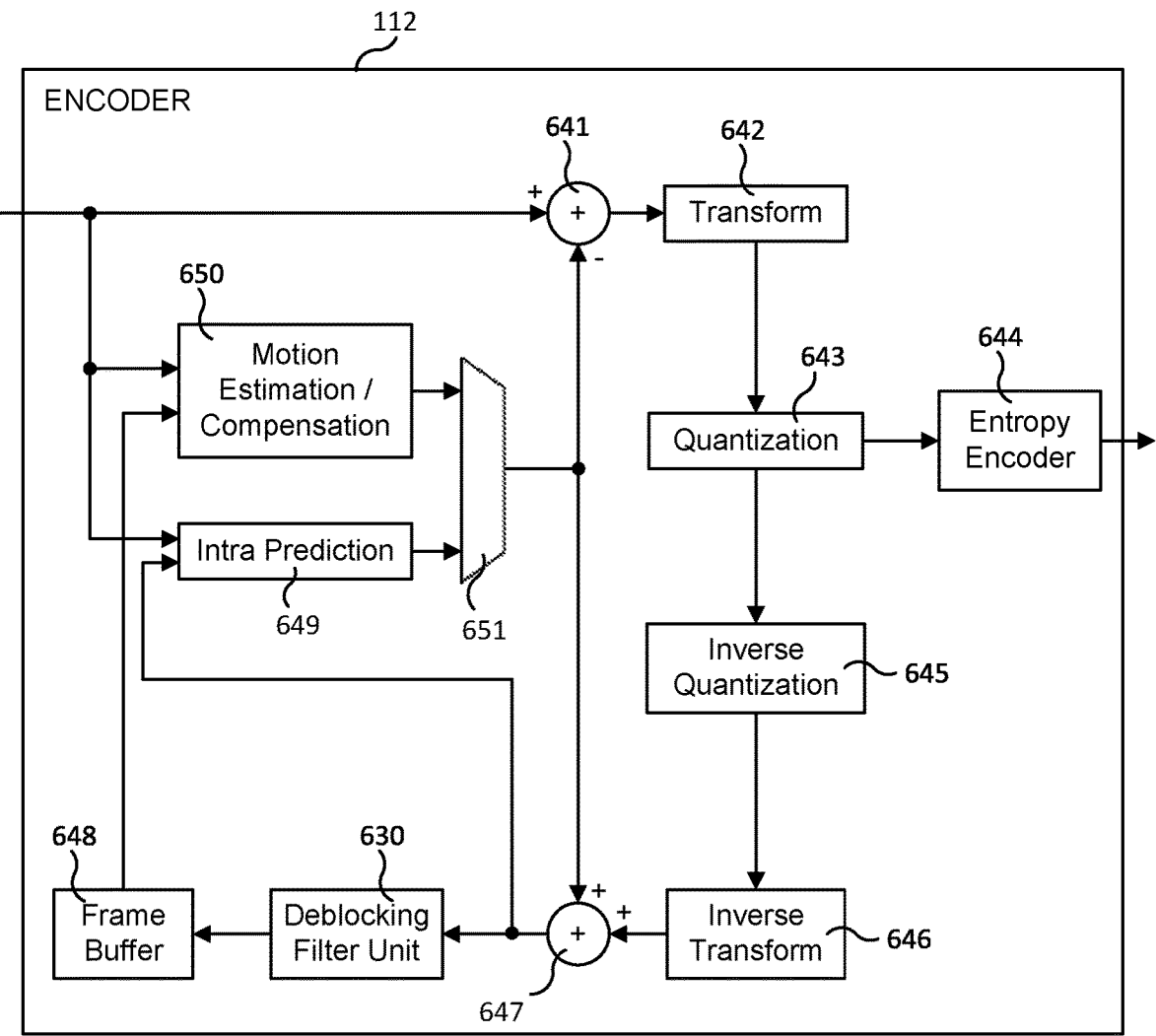
FIG. 6 shows an encoder according to some embodiments.

FIG. 6 is a schematic block diagram of encoder 112 for encoding a block of pixel values (hereafter "block") in a video frame (picture) of a video sequence according to an embodiment. A current block is predicted by performing a motion estimation by a motion estimator 650 from an already provided block in the same frame or in a previous frame. The result of the motion estimation is a motion or displacement vector associated with the reference block, in the case of inter prediction. The motion vector is utilized by a motion compensator 650 for outputting an inter prediction of the block. An intra predictor 649 computes an intra prediction of the current block. The outputs from the motion estimator/compensator 650 and the intra predictor 649 are input in a selector 651 that either selects intra prediction or inter prediction for the current block. The output from the selector 651 is input to an error calculator in the form of an adder 641 that also receives the pixel values of the current block. The adder 641 calculates and outputs a residual error as the difference in pixel values between the block and its prediction. The error is transformed in a transformer 642, such as by a discrete cosine transform, and quantized by a quantizer 643 followed by coding in an encoder 644, such as by entropy encoder. In inter coding, also the estimated motion vector is brought to the encoder 644 for generating the coded representation of the current block. The transformed and quantized residual error for the current block is also provided to an inverse quantizer 645 and inverse transformer 646 to retrieve the original residual error. This error is added by an adder 647 to the block prediction output from the motion compensator 650 or the intra predictor 649 to create a reference block that can be used in the prediction and coding of a next block. This new reference block is first processed by a deblocking filter unit 630 according to the embodiments in order to perform filtering to combat any blocking artifact. The processed new reference block is then temporarily stored in a frame buffer 648, where it is available to the intra predictor 649 and the motion estimator/compensator 650.

Figure 8:
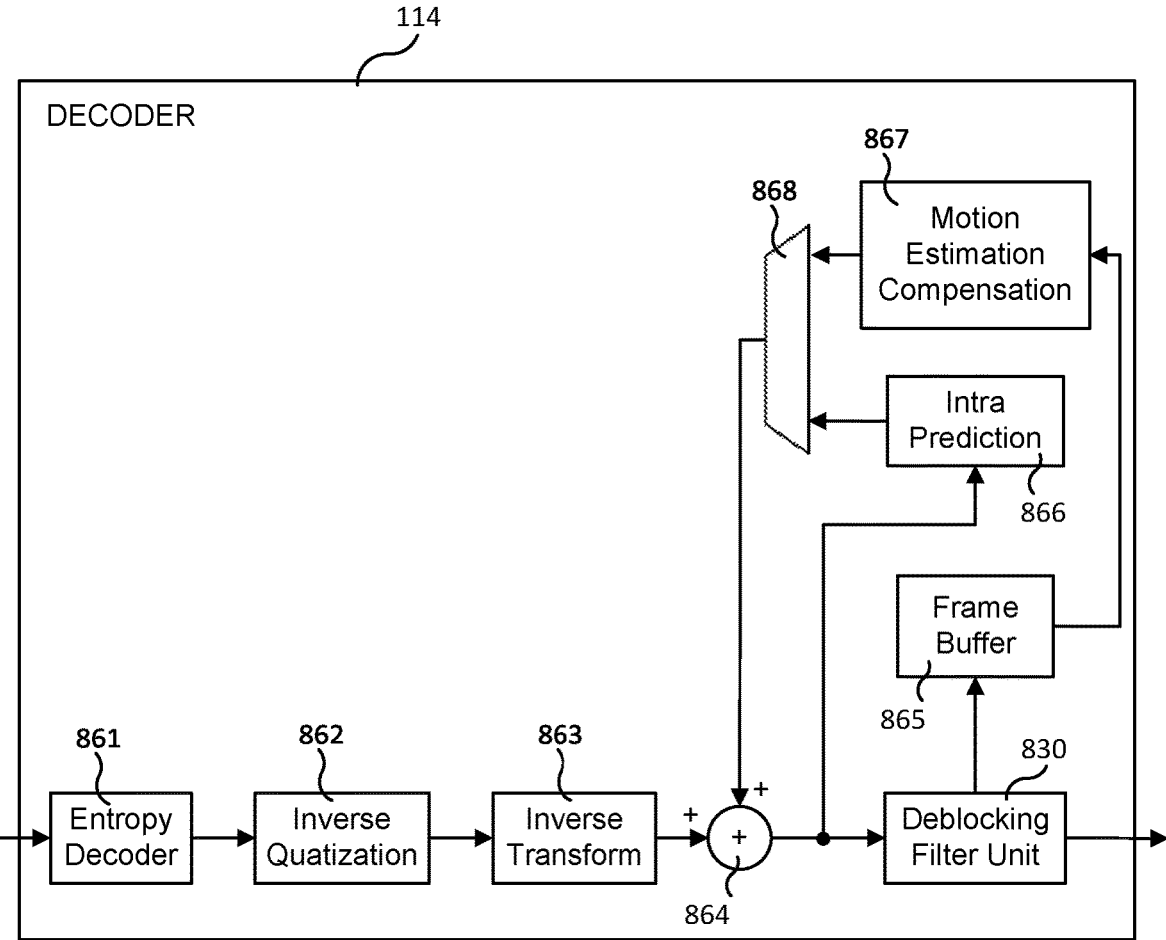
FIG. 8 shows a decoder according to some embodiments.

FIG. 8 is a schematic block diagram of decoder 114 according to some embodiments. Decoder 114 comprises a decoder 861, such as entropy decoder, for decoding an encoded representation of a block to get a set of quantized and transformed residual errors. These residual errors are dequantized in an inverse quantizer 862 and inverse transformed by an inverse transformer 863 to get a set of residual errors. These residual errors are added in an adder 864 to the pixel values of a reference block. The reference block is determined by a motion estimator/compensator 867 or intra predictor 866, depending on whether inter or intra prediction is performed. A selector 868 is thereby interconnected to the adder 864 and the motion estimator/compensator 867 and the intra predictor 866. The resulting decoded block output form the adder 864 is input to a deblocking filter unit QQ330 according to the embodiments in order to filter any blocking artifacts. The filtered block is output form the decoder QQ204 and is furthermore preferably temporarily provided to a frame buffer 865 and can be used as a reference block for a subsequent block to be decoded. The frame buffer 865 is thereby connected to the motion estimator/compensator 867 to make the stored blocks of pixels available to the motion estimator/compensator 867. The output from the adder 864 is preferably also input to the intra predictor 866 to be used as an unfiltered reference block.

CONCLUSION

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for decoding a video frame, the method comprising:

receiving an encoded video frame sequence data associated with a video frame sequence, wherein the video frame sequence includes the video frame;

deriving from the received encoded video frame sequence data (i) sample value information of one or more blocks and/or (ii) block information about said one or more blocks;

based on (i) the derived sample value information and/or (ii) the derived block information, selecting from a set of machine learning (ML) models at least one ML model to use for decoding the video frame; and decoding the video frame using the selected at least one ML model, wherein the block information about said one or more blocks comprises any one or more of:

a slice type information identifying a type of a slice included in the video frame, an inter or intra coded block information indicating how one or more blocks are inter-coded or intra-coded, a frame quantization parameter, QP, information indicating a QP associated with the video frame, a delta QP information indicating the existence and the value of a QP associated with one or more blocks, a motion vector information indicating one or more motion vectors associated with one or more blocks, wherein the motion vector information includes the existence and the value of one or more motion vectors associated with said one or more blocks, a block partitioning information indicating how blocks are partitioned in the video frame, a picture tile partitioning information indicating how tiles are partitioned in the video frame, a picture slice partitioning information indicating how slices are partitioned in the video frame, a subpicture partitioning information indicating how subpictures are partitioned in the video frame, block information about one or more blocks included in another video frame included in the video frame sequence, a temporal layer identifier information indicating information about which temporal layer one or more blocks belongs to, statistics of a current coding tree unit, CTU, wherein the statistics of the CTU are statistics of values of samples included in the current CTU, or statistics of one or more neighboring CTUs neighboring the current CTU, wherein the statistics of said one or more neighboring CTUs are statistics of values of samples included in said one or more neighboring CTUS, the sample value information of said one or more blocks includes sample values of samples included in the video frame, the method further comprises obtaining reconstructed samples based on the sample values of the samples included in the video frame, and the decoding of the video frame comprises filtering the reconstructed samples using the selected ML model.

2. The method of claim 1, wherein the sample value information comprises any one or more of:

a luma value of one or more samples included in the video frame, a chroma value of one or more samples included in the video frame, one or more sample values of samples included in a current CTU and/or a neighboring CTU neighboring the current CTU, one or more sample values of samples included in one or more CTUs from another video frame included in the video frame sequence, a variance of sample values of samples in the current CTU, or a difference between a variance of sample values of samples in a neighboring CTU and a variance of sample values of samples in another neighboring CTU.

3. The method of claim 1, wherein the selection of the ML model to use for decoding the video frame is made based on the reconstructed samples.

4. The method of claim 1, wherein each ML model included in the set of ML models is a loop filtering model.

5. The method of claim 1, wherein the block information comprises a set of block information parameters, the set of block information parameters comprises a subset of block information parameters, and said at least one ML model is selected using the subset of block information parameters.

6. The method of claim 1, wherein (i) the sample value information of one or more blocks includes first sample value information of a first block included in the video frame and second sample value information of a second block included in the video frame and/or (ii) the block information of one or more blocks includes first block information of the first block and second block information of the second block, selecting said at least one ML model to use for decoding the video frame comprises:

based on (i) the first sample value information and/or ii) the first block information, selecting from the set of ML models a first ML model to use for decoding the first block, and based on (i) the second sample value information and/or ii) the second block information, selecting from the set of ML models a second ML model to use for decoding the second block, and decoding the video frame using the selected at least one ML model comprises:

decoding the first block using the first ML model, and decoding the second block using the second ML model.

7. The method of claim 1, wherein each of said one or more blocks is any one or more of a CTU, a tile, a slice, or a subpicture.

8. A method for encoding a video frame, the method comprising:

obtaining (i) sample value information of one or more blocks and/or (ii) block information about said one or more blocks;

encoding (i) the sample value information of said one or more blocks and/or (ii) the block information about said one or more blocks into a video frame sequence data associated with a video frame sequence; and encoding into the video frame sequence data one or more ML model selection syntax elements, wherein a value of said one or more ML model selection syntax elements indicates whether the encoded video frame sequence data comprises information indicating which ML model to use for decoding the video frame, wherein the video frame sequence includes the video frame, and at least one ML model for decoding the video frame is selected from a plurality of ML models based on the sample value information and/or the block information using a ML selection algorithm.

9. The method of claim 8, wherein the ML selection algorithm is stored in an encoder.

10. An apparatus for decoding a video frame, the apparatus comprising:

a memory; and processing circuitry coupled to the memory, wherein the apparatus is configured to perform a method for decoding a video frame, the method comprising:

receiving an encoded video frame sequence data associated with a video frame sequence, wherein the video frame sequence includes the video frame;

deriving from the received encoded video frame sequence data (i) sample value information of one or more blocks and/or (ii) block information about said one or more blocks;

based on (i) the derived sample value information and/or (ii) the derived block information, selecting from a set of machine learning (ML) models at least one ML model to use for decoding the video frame; and decoding the video frame using the selected at least one ML model, wherein the block information about said one or more blocks comprises any one or more of:

a slice type information identifying a type of a slice included in the video frame, an inter or intra coded block information indicating how one or more blocks are inter-coded or intra-coded, a frame quantization parameter, QP, information indicating a QP associated with the video frame, a delta QP information indicating the existence and the value of a QP associated with one or more blocks, a motion vector information indicating one or more motion vectors associated with one or more blocks, wherein the motion vector information includes the existence and the value of one or more motion vectors associated with said one or more blocks, a block partitioning information indicating how blocks are partitioned in the video frame, a picture tile partitioning information indicating how tiles are partitioned in the video frame, a picture slice partitioning information indicating how slices are partitioned in the video frame, a subpicture partitioning information indicating how subpictures are partitioned in the video frame, block information about one or more blocks included in another video frame included in the video frame sequence, a temporal layer identifier information indicating information about which temporal layer one or more blocks belongs to, statistics of a current coding tree unit, CTU, wherein the statistics of the CTU are statistics of values of samples included in the current CTU, or statistics of one or more neighboring CTUs neighboring the current CTU, wherein the statistics of said one or more neighboring CTUs are statistics of values of samples included in said one or more neighboring CTUS, the sample value information of said one or more blocks includes sample values of samples included in the video frame, the method further comprises obtaining reconstructed samples based on the sample values of the samples included in the video frame, and the decoding of the video frame comprises filtering the reconstructed samples using the selected ML model.

11. The apparatus of claim 10, wherein the sample value information comprises any one or more of:

a luma value of one or more samples included in the video frame, a chroma value of one or more samples included in the video frame, one or more sample values of samples included in a current CTU and/or a neighboring CTU neighboring the current CTU, one or more sample values of samples included in one or more CTUs from another video frame included in the video frame sequence, a variance of sample values of samples in the current CTU, or a difference between a variance of sample values of samples in a neighboring CTU and a variance of sample values of samples in another neighboring CTU.

12. The apparatus of claim 10, wherein the selection of the ML model to use for decoding the video frame is made based on the reconstructed samples.

13. The apparatus of claim 10, wherein the block information comprises a set of block information parameters, the set of block information parameters comprises a subset of block information parameters, and said at least one ML model is selected using the subset of block information parameters.

14. The apparatus of claim 10, wherein (i) the sample value information of one or more blocks includes first sample value information of a first block included in the video frame and second sample value information of a second block included in the video frame and/or (ii) the block information of one or more blocks includes first block information of the first block and second block information of the second block, selecting said at least one ML model to use for decoding the video frame comprises:

based on (i) the first sample value information and/or ii) the first block information, selecting from the set of ML models a first ML model to use for decoding the first block, and based on (i) the second sample value information and/or ii) the second block information, selecting from the set of ML models a second ML model to use for decoding the second block, and decoding the video frame using the selected at least one ML model comprises:

decoding the first block using the first ML model, and decoding the second block using the second ML model.

15. An apparatus for encoding a video frame, the apparatus comprising:

a memory; and processing circuitry coupled to the memory, wherein the apparatus is configured to:

obtain (i) sample value information of one or more blocks and/or (ii) block information about said one or more blocks;

encode (i) the sample value information of said one or more blocks and/or (ii) the block information about said one or more blocks into a video frame sequence data associated with a video frame sequence; and encode into the video frame sequence data one or more ML model selection syntax elements, wherein a value of said one or more ML model selection syntax elements indicates whether the encoded video frame sequence data comprises information indicating which ML model to use for decoding the video frame, wherein the video frame sequence includes the video frame, and at least one ML model for decoding the video frame is selected from a plurality of ML models based on the sample value information and/or the block information using a ML selection algorithm.

16. The apparatus of claim 15, wherein the ML selection algorithm is stored in an encoder.

* * * * *